(12) United States Patent
Oteman et al.

(10) Patent No.: US 8,113,522 B2
(45) Date of Patent: *Feb. 14, 2012

(54) COUNTER-ROTATING MOTORS WITH LINEAR OUTPUT

(75) Inventors: David G. Oteman, Natick, MA (US); Steven N. Brown, Hopkinton, MA (US); Dariusz Antoni Bushko, Hopkinton, MA (US); Wade P. Torress, Attleboro, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/088,075

(22) Filed: Apr. 15, 2011

(65) Prior Publication Data

US 2011/0193300 A1 Aug. 11, 2011

Related U.S. Application Data

(63) Continuation of application No. 12/206,247, filed on Sep. 8, 2008, now Pat. No. 7,963,529.

(51) Int. Cl.
*B60G 17/00* (2006.01)

(52) U.S. Cl. ............... 280/5.515; 280/5.514; 74/89.23; 74/89.26

(58) Field of Classification Search ............... 74/89.26, 74/89.29, 89.3, 89.23; 280/5.514, 5.515, 280/6.157, 6.159; 188/266, 266.3, 322.16
See application file for complete search history.

(56) References Cited

U.S. PATENT DOCUMENTS

| | | | | |
|---|---|---|---|---|
| 5,491,633 | A * | 2/1996 | Henry et al. ................... 701/36 |
| 6,981,428 | B2 * | 1/2006 | Donald et al. ............... 74/89.26 |
| 7,624,850 | B2 * | 12/2009 | Namuduri et al. ......... 188/267.2 |
| 7,905,157 | B2 * | 3/2011 | Shige et al. ................ 74/424.82 |
| 2003/0006119 | A1 * | 1/2003 | Harvey ......................... 192/141 |
| 2009/0095584 | A1 * | 4/2009 | Kondo et al. ................. 188/267 |
| 2010/0242642 | A1 * | 9/2010 | Ganter ......................... 74/89.23 |
| 2011/0018214 | A1 * | 1/2011 | Kondo ...................... 280/5.515 |

* cited by examiner

*Primary Examiner* — Paul N Dickson
*Assistant Examiner* — James English

(57) ABSTRACT

An actuator includes a first rotary motor, a second rotary motor, and a transmission coupled to the first and second rotary motors. The transmission converts rotation of the first rotary motor in a first direction and simultaneous rotation of the second rotary motor in a second direction to linear motion of an output shaft in a single direction. The actuator is usable in an active automobile suspension.

12 Claims, 8 Drawing Sheets

US 8,113,522 B2

COUNTER-ROTATING MOTORS WITH LINEAR OUTPUT

CROSS-REFERENCE TO RELATED APPLICATIONS

This application is a continuation of U.S. patent application Ser. No. 12/206,247, filed on Sep. 8, 2008.

BACKGROUND

This disclosure relates to counter-rotating motors with linear motion output. U.S. Pat. No. 4,981,309 describes a linear motor for use in an active automobile suspension.

SUMMARY

In general, in some aspects, an actuator includes a first rotary motor, a second rotary motor, and a transmission coupled to the first and second rotary motors. The transmission converts rotation of the first rotary motor in a first direction and simultaneous rotation of the second rotary motor in a second direction to linear motion of an output shaft in a single direction.

Implementations may include one or more of the following. The first and second rotary motors are arranged serially and rotate around a common axis. The transmission includes a first ball nut coupled to the first rotary motor; a second ball nut coupled to the second rotary motor, the first and second ball nuts being constructed with opposite thread directions; and a ball screw having a first threaded region matching the thread direction of the first ball nut and a second threaded region matching the thread direction of the second ball nut. The first rotary motor rotates around a first axis, and the second rotary motor rotates around a second axis distinct from the first axis. The transmission includes a first rotary-to-linear transmission coupled to the first rotary motor; a second rotary-to-linear transmission coupled to the second rotary motor; and a yoke coupled to the first and second rotary-to-linear transmissions. The first and second rotary-to-linear transmissions each include a ball nut coupled to the respective rotary motor and a ball screw coupled to the corresponding ball nut and to the output shaft. A sub-assembly including the first and second rotary motors is located at least partially inside a coil spring. The first and second rotary motors are located entirely inside the coil spring. A portion of the output shaft extending out of the first and second motors is located inside an air spring suspension element.

A first power amplifier is coupled to drive at least the first rotary motor; a position sensor indicates a position of the transmission; and control circuitry coupled to the encoder and the first power amplifier is configured to operate the power amplifier to drive the first and second rotary motors cooperatively based on the position indication of the encoder. The control circuitry infers the position of the second rotary motor from the position of the first rotary motor based on a combination of tolerances of the first and second rotary motors and the first and second transmissions. A second power amplifier is coupled to drive the second rotary motor; the control circuitry is also coupled to the second power amplifier. The position sensor includes a rotary position sensor coupled to the first rotary motor and the position of the second rotary motor is inferred from the position of the first rotary motor. The position sensor includes a first rotary position sensor coupled to the first rotary motor and a second rotary position sensor coupled to the second rotary motor. A sensor indicates movement of the transmission, and control circuitry receives a force command and is configured to compute a compensation force based on a reflected inertia of the transmission and an acceleration computed from the sensor, compute a total force from the force command and the compensation force, and operate the first and second motors based on the total force. A sensor indicates force output of the transmission, and control circuitry receives a force command and the indicated force output and modifies a control command provided to the first and second motors based on a difference between the force command and the indicated force output.

A bellows surrounds a portion of the transmission extending external to the first and second rotary motors at a first end of the apparatus and seals an interior of the first and second rotary motors from a surrounding environment; the transmission includes a channel running through an output shaft and coupling fluid from the bellows to a volume at a second end of the apparatus. The transmission is selected from the group consisting of ball screws; roller screws; magnetic screws; hydrostatic screws; lead screws, and tapered roller screws. Bumpers located along an axis of the output shaft are configured to transfer energy from the output shaft into a surrounding structure when the output shaft is maximally retracted or extended such that at least some energy from the output shaft is not coupled to the surrounding structure through the first or second motors.

In general, in one aspect, in an automobile suspension coupling a wheel assembly to a sprung mass, the suspension includes an active suspension element coupled to the wheel assembly and the sprung mass. The suspension and includes a first rotary motor, a second rotary motor, and a transmission coupled to the first and second rotary motors. The transmission converts rotation of the first rotary motor in a first direction and simultaneous rotation of the second rotary motor in a second direction to linear motion of an output shaft in a single direction.

In some examples, linkages coupled to the wheel assembly and sprung mass control the geometry of relative motion between the wheel assembly and the sprung mass.

In general, in one aspect, in an automobile suspension coupling a wheel assembly to a sprung mass, the suspension includes an active suspension element including a first rotary motor and a second rotary motor. The first and second rotary motors are coupled to one of the wheel assembly and the sprung mass and are arranged linearly to rotate around a common axis. A first ball nut is coupled to the first rotary motor and a second ball nut is coupled to the second rotary motor. The first and second ball nuts are constructed with opposite thread directions. A ball screw is coupled to the other of the wheel assembly and the sprung mass and has a first threaded region matching the thread direction of the first ball nut and a second threaded region matching the thread direction of the second ball nut to convert rotation of the first rotary motor in a first direction and simultaneous rotation of the second rotary motor in a second direction to linear motion of the ball screw in a single direction. A passive suspension element includes a coil spring at least partially surrounding the active suspension element and coupling the active suspension element to the sprung mass.

In some examples, the coil spring is positioned functionally in parallel with the ball screw and couples a motor housing of the active suspension element to the sprung mass. In some examples, the coil spring is positioned functionally in parallel with the ball screw and the motors and couples an end of the ball screw to the sprung mass.

Advantages include providing a linear actuator in the package space normally occupied by passive suspension components, and using compact rotary actuators without imparting reaction torque to the surrounding structure. Use of a transmission having a non-unity motion ratio provides improved flexibility in component size and packaging.

Other features and advantages will be apparent from the description and the claims.

DESCRIPTION

DETAILED DESCRIPTION

Rotary motors with transmissions providing linear output can provide similar performance to linear motors while requiring less packaging space, but they generally produce angular reaction forces that put torque (also referred to as moment) on the output shaft and on the structures to which the motors and output shaft are attached. As described below, a counter-rotating pair of rotary motors minimizes the torque the pair applies to the supporting structure. A transmission couples the outputs of both of the counter-rotating motors to a single linear output shaft. In general, we refer to individual rotor/stator combinations as "motors," and the combined assembly of motors and transmission as an "actuator."

Figure 1:
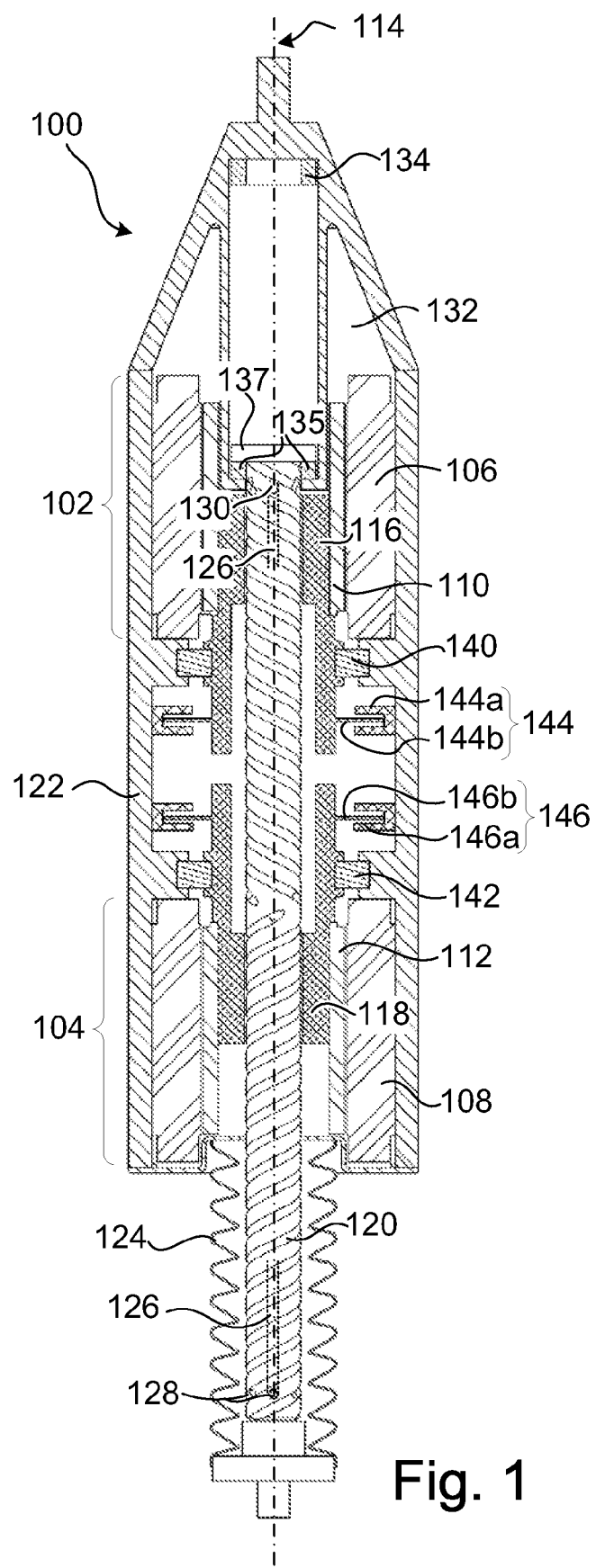
FIG. 1 shows a side cutaway view of stacked counter-rotating motors with a linear output transmission.

In some examples, as shown in FIG. 1, a linear actuator 100 includes an upper motor 102 and a lower motor 104. Each motor is made up of a stator 106, 108 and a rotor 110, 112. In this example, the rotors 110, 112 rotate around a common axis 114. The rotors 110, 112 are coupled to the rotating part of a rotary-to-linear transmission. In the example of FIG. 1, the transmission is a ball-screw-type transmission with rotating ball nuts 116, 118 and a ball screw linear output shaft 120. The transmission is shown fully extended for clarity of illustration. A motor housing 122 contains the motors and covers one end of the actuator assembly. A bellows 124 covers the portion of the output shaft that extends from the motor housing 122 at the other end. The bellows extends with the output shaft and prevents foreign matter from entering the motors through the opening in the housing through which the output shaft exits. In some examples, a bore 126 (shown at the ends only) through the center of the output shaft is coupled to vents 128, 130 at either end of the shaft. As the output shaft extends and retracts, the volume in the bellows increases and decreases. To reduce changes in air pressure in the bellows, the air channel formed by the bore 126 and the vents 128, 130 allows air to flow between the bellows 124 and a volume 132 at the opposite end of the motor housing 122. This increases the total volume of air available in the system, decreasing the pressure change in the bellows. At the end of the actuator opposite the output shaft, a bump stop 134 prevents the output shaft from colliding with the motor housing when fully retracted and a rebound stop 135 prevents the output shaft from colliding with the motor housing when fully extended. Locating the stops 134, 135 end of the shaft allows the shock from any bump or rebound to be transferred directly to the external structure, rather than traveling through the motor housing 122. This also allows a single end-plate 137 to stop the output shaft at either extent of its travel.

Each motor includes a bearing 140, 142 that allows the rotor to rotate while maintaining a precise air gap between the rotor and stator. In some examples, as in FIG. 1, the bearing 140, 142 and the ball nut 116, 118 of each motor make up a single component. A position sensor 144 is coupled to the actuator and used to determine the position of the output shaft. Possible position sensors include direct rotary or linear position sensors, velocity sensors, and accelerometers, with appropriate differentiation or integration used to determine the needed parameters. Rotary and linear positions are inferred from each other, as needed, based on the motion ratio of the transmission. In some examples, two rotary sensors are used, while in other examples only a single rotary or linear sensor is used, as explained below. The position sensor indicates the motor position and output shaft position to control electronics to enable precise knowledge and control of the actuator's position. In the example of FIG. 1, a separate rotary encoder 144, 146 is attached to each motor, with a stationary part 144a, 146a detecting a symbol on a rotating part 144b, 146b connected to the rotor. In some examples, an additional absolute position sensor (not shown) is used to report the position of the actuator to external control algorithms.

In the example of FIG. 1, the motors are of the "moving magnet" type, such that the rotors 110, 112 are made up of magnets and the stators 106, 108 include coils. When an electrical current is passed through the coils, a rotating magnetic field is created, causing the rotors to turn around the axis 114. In some examples, the stators are wound in opposite directions, such that matching input signals cause the motors to rotate in opposite directions. In some examples, the coils are identical and the input signals to one motor are reversed, relative to the other, for the same effect. In other examples, moving coil or other types of motors are used.

Figure 2A:
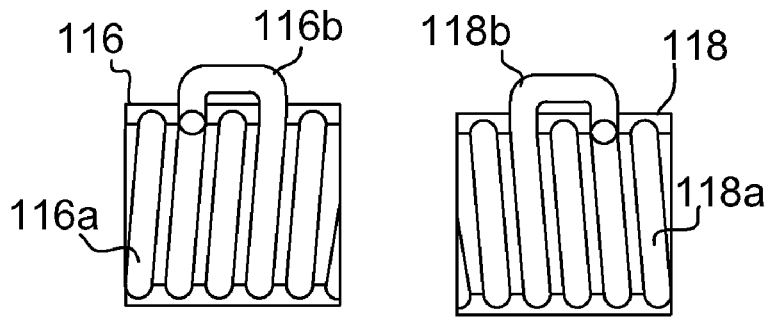
FIG. 2A shows a cross-sectional view of a pair of ball nuts.
Figure 2B:
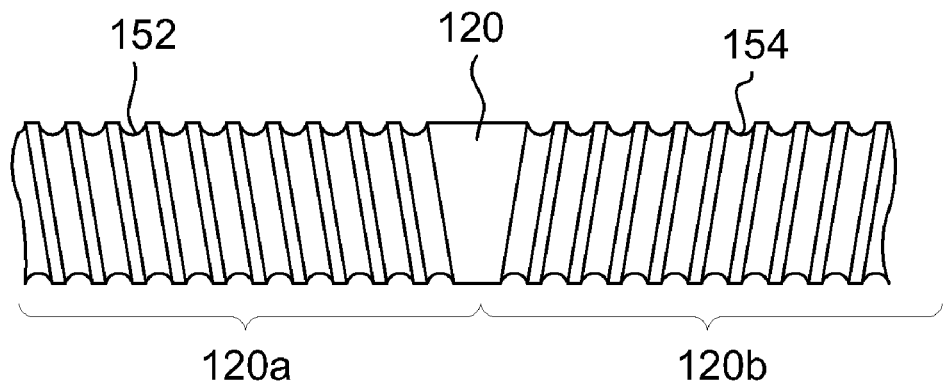
FIG. 2B shows a double-threaded ball screw.
Figure 2C:
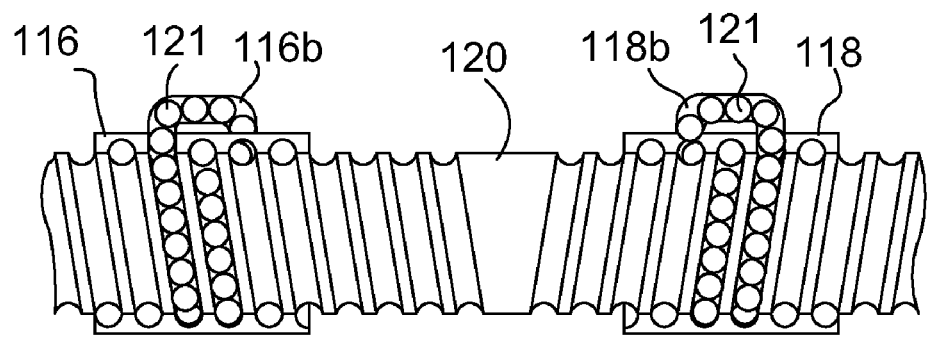
FIG. 2C shows the double-threaded ball screw of FIG. 2B in combination with the ball nuts of FIG. 2A.

When the motors rotate, the transmission converts the rotation into linear motion. In the example of FIG. 1, the ball nuts turn with the rotors and cause linear motion of the ball screw. To prevent the actuator from exerting rotational forces on the surrounding structure, the two motors are designed and controlled to rotate simultaneously in opposite directions. This requires that the transmission convert simultaneous rotation in two directions to linear motion in one direction. In some examples, as shown in FIG. 1, this is accomplished by stacking the two motors and coupling them serially to a two-part transmission, the two parts each converting rotary motion in their respective opposite directions to linear motion in the common direction and operating cooperatively to move a single output shaft. For a ball-screw transmission, as shown in more detail in FIGS. 2A-2C, the two ball nuts 116, 118 are fabricated with their ball chases 116a, 118a spiraling in opposite directions (in the example of FIG. 2C, only two turns of thread contain ball bearings; the number of threads used is a design choice in any given implementation). The ball screw 120 includes threads cut in two different directions along its length, a first thread 152 on approximately half the length 120a of the shaft and corresponding to the first ball nut 116, and a second thread 154 on the remainder 120b of the shaft and corresponding to the second ball nut 118. When assembled, tubes formed from aligned threads in the ball screw and chases in the ball nuts are filled with ball bearings 121, which are free to circulate through ball returns 116b, 118b. The type of ball returns shown in FIGS. 2A and 2C are for illustration only—various ball return designs may be used, depending on such factors as the sizes of the parts, forces involved, and packaging requirements. The ball bearings 121 serve to transfer torque on the ball nut to linear motion of the ball screw, or vice-versa. In some examples, as shown in FIG. 1, the ball nuts are shorter than the motors, and are located towards the middle of the actuator (as opposed to, for example, the middles or outer ends of the motors). This has the advantage of increasing the total travel possible for the ball screw. The two motors 102, 104 are located with a gap in between (see FIG. 1) that provides room for the section 120a of the ball screw 120 bearing the first thread 152 to extend out from the first motor 102 without entering the second ball nut 118. Likewise, the section 120b of the ball screw 120 bearing the second thread 154 does not enter the first ball nut 116 when the shaft is retracted.

One constraint in selecting a rotary-to-linear transmission for use in a suspension is that the linear output should be back-drivable, that is, forces exerted on the output shaft by the unsprung mass result in rotation of the motors without jamming. It is also desirable to minimize backlash, that is, a change in direction of the external force on the output shaft should translate to a change in direction of the induced rotation of the motors with minimal motion not being converted. Another constraint is that reflected inertia, the effective inertia of the transmission, should be minimized. That is, the transmission should convert between rotary and linear motion without adding an additional reflected inertia term when the actuator is viewed from input to output. A ball screw is one example of a transmission that provides flexibility in balancing these constraints. Other examples of transmissions that may be suitable in some applications include roller screws, magnetic screws, hydrostatic screws, lead screws, and tapered roller screws.

The force delivered by a ball screw transmission depends on the number of ball bearings in the interface between the ball nut and ball screw, which depends in turn on the diameter of the screw and the number of threads containing balls. The number of threads in the interface depends on the length of the nut and the pitch of the threads. An increased ball screw diameter allows the interface between the ball nut and ball screw to accommodate more ball bearings per thread, allowing fewer threads and therefore a shorter nut to deliver a given force. Likewise, an increased thread pitch accommodates more threads, hence more balls, and therefore more force for a given length, or less length for a given force. The length of the ball nuts in turn places constraints on the overall height of the motor assembly. In one example, the force required of the actuator and packaging constraints on the available length for the ball nuts are givens, and the ball screw diameter and thread pitch are selected to accommodate them while minimizing reflected inertia, discussed below.

Figure 3A:
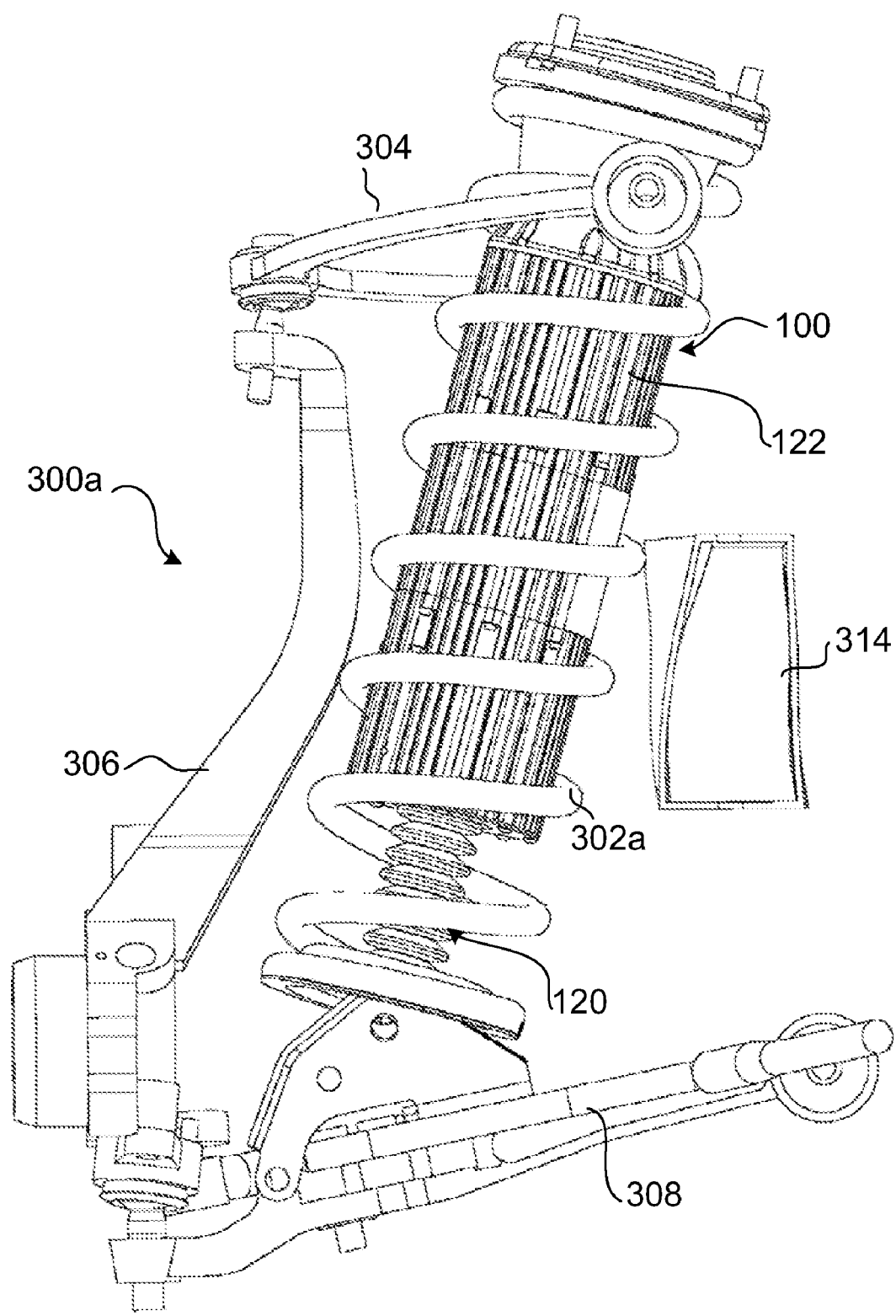
FIGS. 3A and 3B show isometric views of wheel suspensions including the motor and transmission of FIG. 1.
Figure 3B:
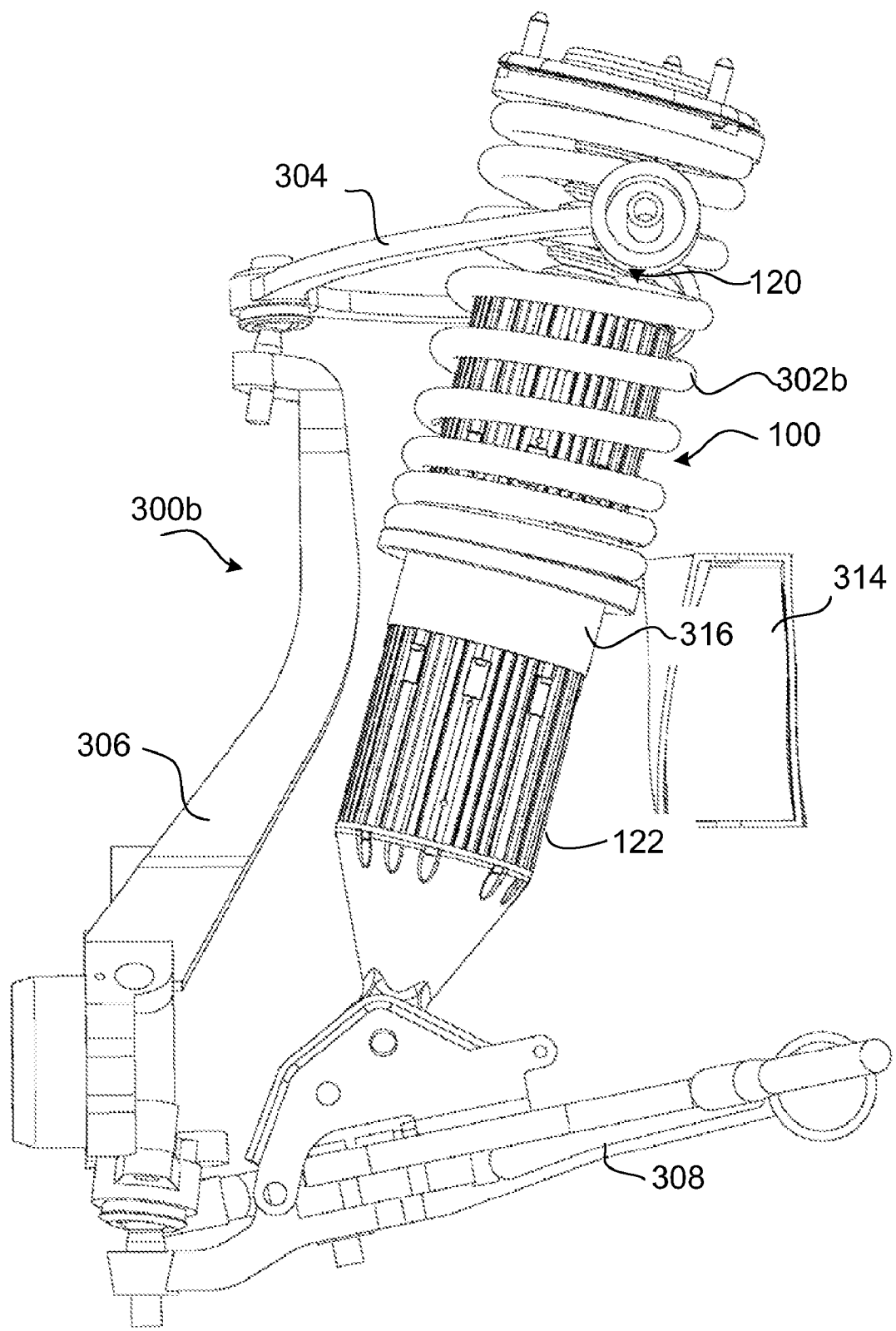
Figure 3C:
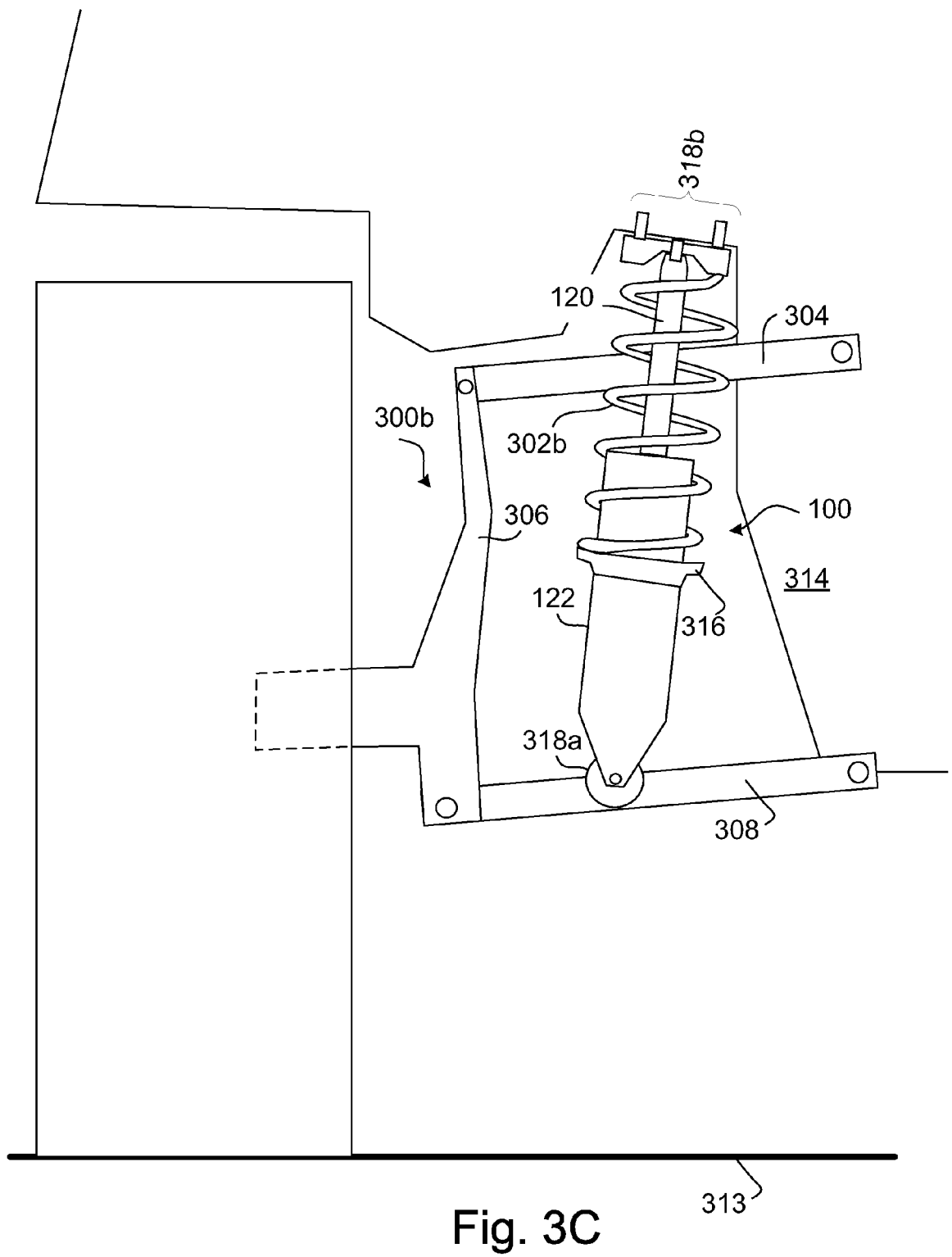
FIGS. 3C and 3D show schematic plan views of wheel suspensions including the motor and transmission of FIG. 1.

FIGS. 3A and 3B show example installations of the stacked actuator 100 of FIG. 1 in a vehicle suspension 300a, 300b. FIG. 3C shows an abstract view of the suspension 300b of FIG. 3B. In addition to the actuator 100, the suspension 300a, 300b also includes a passive suspension element, a spring 302a, 302b. The suspension 300a, 300b also includes structural elements: an upper control arm 304, a knuckle 306, and a lower control arm 308. The wheel assembly 310 (FIG. 3C) attaches to the knuckle 306 and the lower control arm 308. The wheel assembly 310 couples the suspension to the ground 313. The actuator is connected to the suspension through a bushing 318a and to the vehicle body 314 through a second bushing 318b. In some examples, the bushings 318a, 318b are standard bushings used to mount a passive shock absorber. The structural elements maintain the geometric relationship between the wheel hub 310 and the sprung mass of the vehicle, i.e., the vehicle body 314. In the views of FIGS. 3A and 3B, the actuator housing 122 is shaped into fins that serve as a heatsink.

In some examples, as shown in FIGS. 3A and 3B, the passive suspension element includes a coil spring. The passive suspension element supports the static load of the vehicle so that the actuator is at the midpoint of its range of motion when the vehicle is at rest and the actuator is not powered. One advantage of the stacked counter-rotating motor structure is that it can be designed to fit within the inner diameter of a typical coil spring as is currently used in automobile suspensions. The spring may extend the entire length of the actuator, as shown in FIG. 3A, connected between the end of the output shaft 120 and the vehicle structure, or the spring may be anchored to the housing 122 of the actuator instead of the output shaft, as shown in FIG. 3B. In FIG. 3B, a sleeve 316 couples the spring 302b to the housing 122. In some examples (not shown), a second coil spring extends from the sleeve 316 to the other end of the actuator (the bottom end in FIG. 3B). In such an example, the sleeve may be free to slide along the actuator housing to accommodate the relative motion of the spring and the actuator while preventing the two from rubbing. In the example of FIG. 3B, the active suspension structure is inverted, with the motors at the bottom (the wheel end) and the ball screw at the top, extending into the vehicle body 314. Examples using a spring over less than the full length of the actuator may be implemented in the orientation of either example.

Figure 3D:
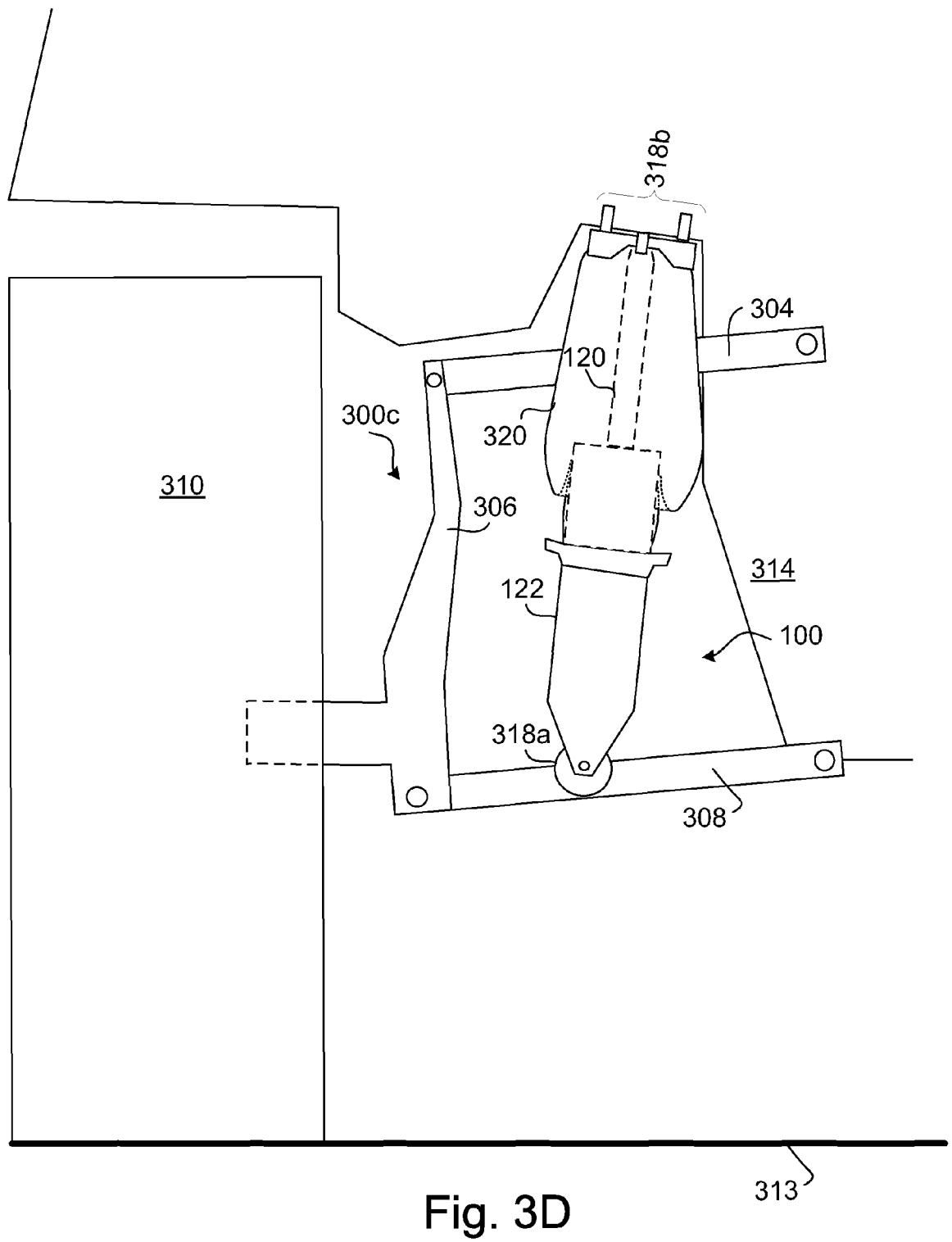

In some examples, as shown in FIG. 3D, the passive suspension element includes an air spring 320. In an air spring suspension 300c, a flexible bag is used as the spring element and the pressure of the air contained within the bag is varied to control the force exerted by the bag. In combination with the active suspension, an air spring suspension element can be controlled to offset changes in the static load (such as the weight of passengers) without significantly changing the overall spring rate of the system. In some examples, as shown, the air spring is installed around the output shaft of the ball screw and takes the place of the bellows of FIG. 1, sealing the motors against outside elements. In this example, the design of the air channel in the output shaft 120 is modified, and the channel may be removed entirely, depending on the design of the air spring. Note also that in this example, the actuator structure is inverted as in FIG. 3B. The motors are located at the wheel end of the suspension, with the output shaft and air spring driving upward into the vehicle structure 314. An advantage of this configuration is that it accommodates designs in which the air spring is bulkier than the motor assembly without requiring changes to a vehicle structure designed for a standard passive suspension, as there is more room at the top of the suspension (in the shock tower) than at the wheel hub. In other examples, the motor structure remains at the top and the air spring and ball screw are located at the bottom of the suspension. In the example of FIG. 3D, rolls 320a in the air spring are shown at the downward end of the air spring. In other examples, the rolls may be located at the top end, or a non-rolled air spring may be used.

In some examples, the motor and transmission provide sufficient structural strength to the suspension such that one or both control arms can be eliminated, simplifying the suspension but increasing the importance of eliminating moments from the active components.

Figure 4A:
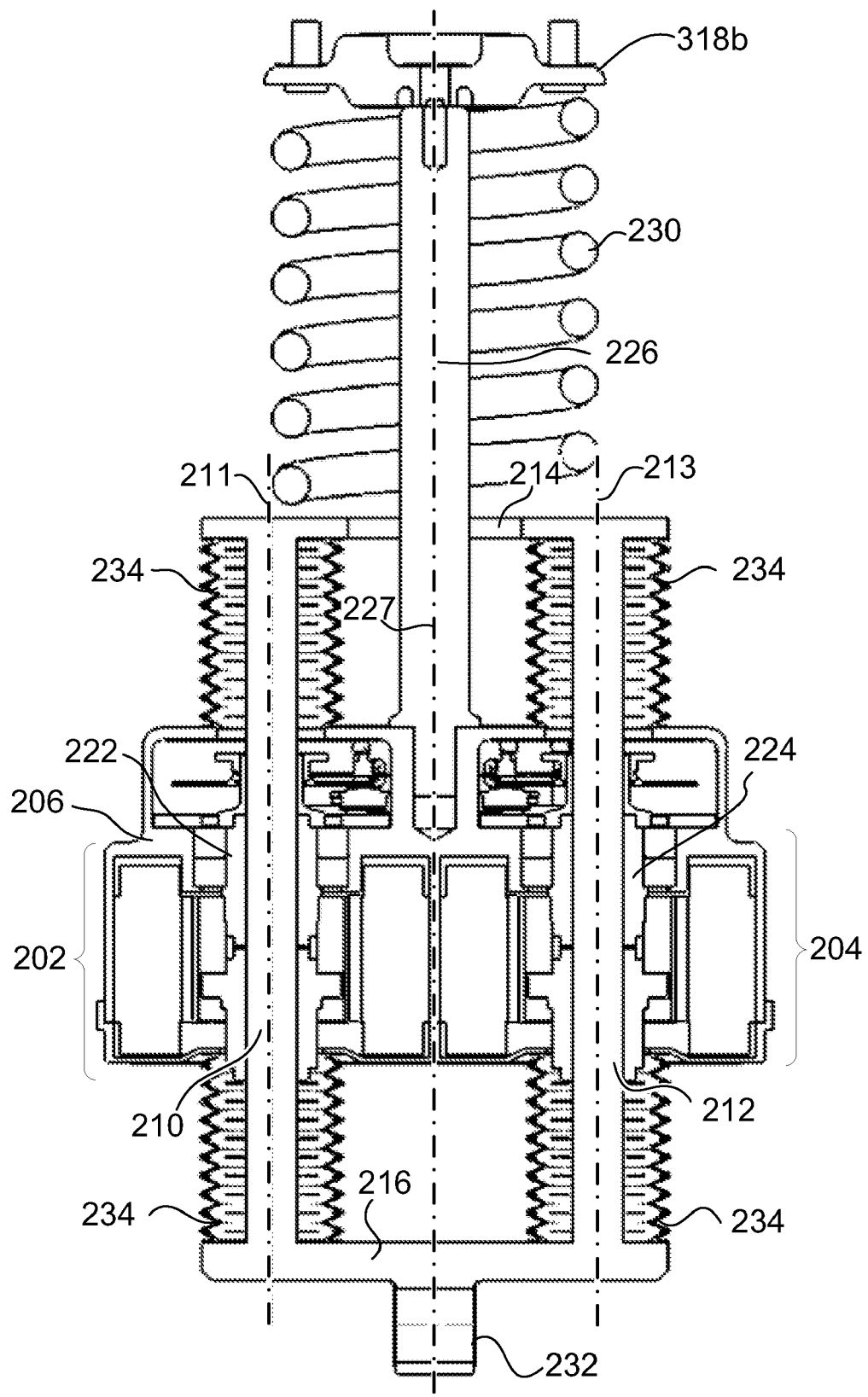
FIG. 4A shows a cross-section view of side-by-side counter-rotating motors with a linear output transmission.
Figure 4B:
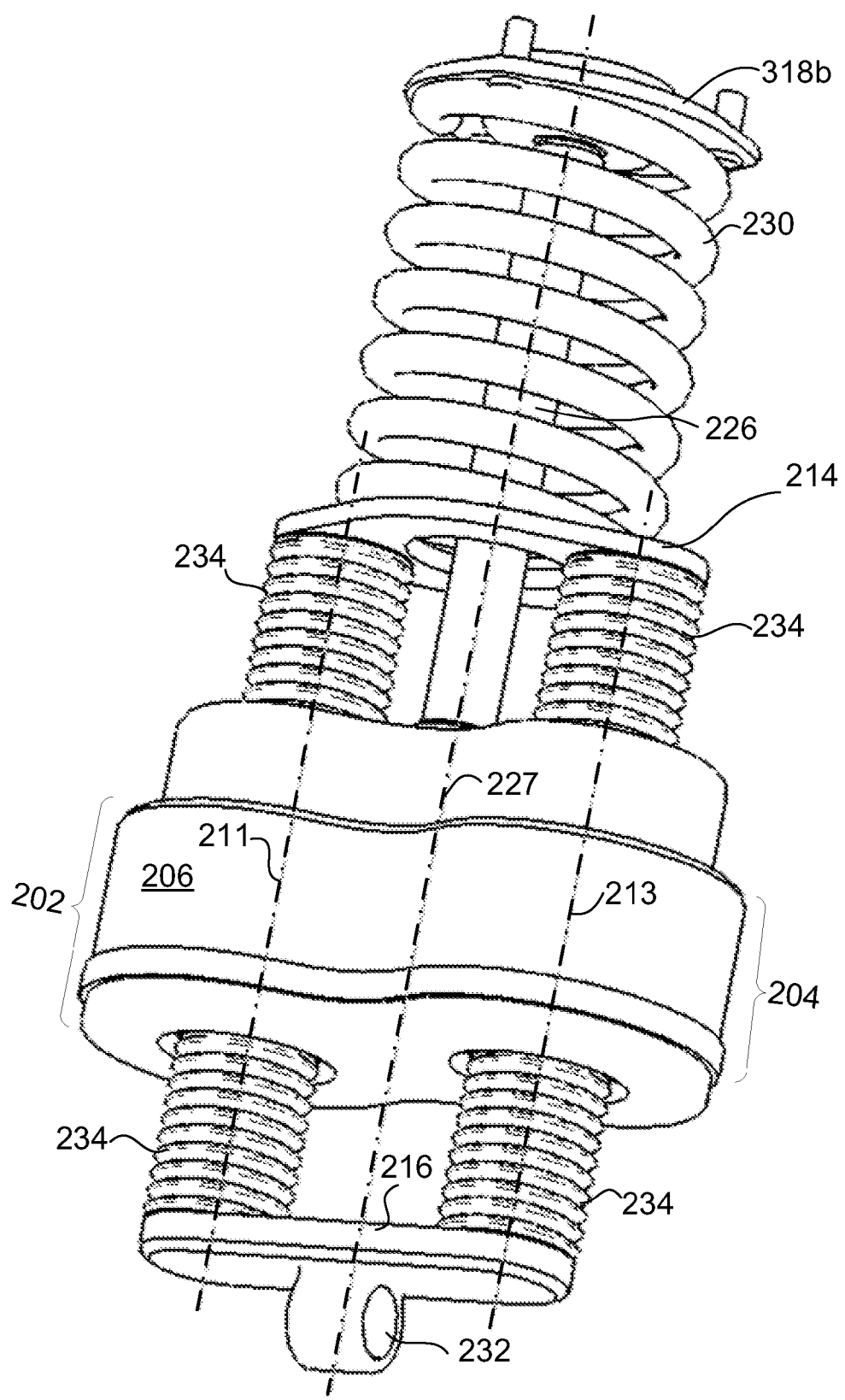
FIG. 4B shows an isometric view of side-by-side counter-rotating motors with a linear output transmission.

In some examples, as shown in FIGS. 4A and 4B, two motors 202, 204 are located in a parallel configuration. The motors may share a single housing 206, as shown, or they may be in separate housings. Two output shafts 210, 212 on parallel axes 211, 213 are joined by a yoke 214 and bar 216. To decrease reaction torque on the supporting structure, as in the stacked example, the two motors 202, 204 operate in opposite directions. The output shafts 210, 212 are coupled to the motors through transmissions 222, 224, as described above. A support shaft 226 along a third axis 227 maintains the position of the motors relative to the vehicle body (not shown) through the bushing 318b, while a spring 230 couples the yoke 214 to the bushing 318b. The bar 216 is coupled to the suspension by anchor 232 (which couples to a bushing 318a as in FIGS. 3C and 3D, not shown). Bellows 234 cover the intermediate output shafts 210, 212 at top and bottom. A parallel configuration provides similar force as the stacked configuration but requires less vertical space, which is advantageous in some applications.

The use of a transmission introduces some flexibility in the design of an active suspension not present when using a direct linear motor. In particular, the transmission introduces a non-unity motion ratio, or mechanical advantage, that can allow the use of smaller motors. The motion ratio MR for the total system is the effective linear velocity of the rotors relative to the stators divided by the velocity of the wheel assembly at the point that the tire touches the ground, referred to as the tire contact patch. This total motion ratio is the product of two motion ratios with in the system:

$$MR = MR_k * MR_{rot}, \quad (1)$$

where $MR_k$ is the kinematic motion ratio resulting from the suspension geometry and $MR_{rot}$ is the motion ratio of the rotary-to-linear transmission. The kinematic motion ratio $MR_k$ is defined as the linear velocity of the output shaft divided by the vertical wheel velocity at the tire contact patch. (Referring to FIG. 3C, viewing the lower control arm 308 as a lever, $MR_k$ would correspond to the placement of the bushing 318a along the arm 308, relative to the total length of the arm). The transmission motion ratio $MR_{rot}$ is defined as the velocity of the rotors relative to the stators divided by the velocity of the output shaft, a function of the ball screw design and motor size. For a ball screw with a pitch $P_{bs}$ and a rotary motor with rotor diameter d, $MR_{rot}$ is found as:

$$MR_{rot} = \pi * d / P_{bs} \quad (2)$$

In a typical automotive suspension, the kinematic motor ratio is in the range of 0.5-0.65. For a unity total motion ratio, this would lead to a $MR_{rot}$ of 1.5-2.0, but larger values of $MR_{rot}$ (achieved by selecting an appropriate ball screw) provide additional design flexibility. For a constant motor efficiency, referred to as beta, the volume of the motor scales as $(1/MR)^2$. Thus, increasing the motion ratio allows for a smaller motor to be used without requiring one with a greater beta. On the other hand, increased motion ratio leads to an increase in reflected inertia, described below.

To control the actuator, commands are sent to one or more amplifiers supplying current to the motors. Generally, the commands indicate the force that the actuator should apply to the suspension. The actuator is used to counteract the acceleration of the unsprung mass (the wheel) relative to the sprung mass (the car), so that the car does not experience accelerations. As noted above, the transmission introduces a reflected inertia component not present in a direct linear actuator. In some examples, the amplifiers driving the motors are controlled to compensate for the reflected inertia, such that the input force signal does not have to be adapted to account for the transmission. The reflected inertia can be modeled as a mass, where the effect on output force due to that mass is based on the relative accelerations of the car and the wheel. The effective reflected mass is found as:

$$M_{REFL} = J_{rot} * (MR_k * MR_{rot} * (2/d))^2, \quad (3)$$

where $J_{rot}$ is the total rotational inertia of the system, typically in units of kg-m².

The electromagnetic output force of the actuator, at the wheel, $F_{EM}$, is found from the motion ratio $MR_{rot}$ of the transmission:

$$F_{EM} = MR_{rot} * (2/d) * T_{EM}, \quad (4)$$

where d is the diameter of the rotor and $T_{EM}$ is the electromagnetic torque. In this example, the properties of the two motors of FIG. 1 are assumed to be identical and to sum into the mathematical model equally.

The force applied by the rotary motor acts on the reflected inertia of the transmission, rather than directly on the unsprung mass. The control of the rotary motors is used to remove the effect of the reflected mass, simplifying the external controls. To do this, the acceleration across the reflected mass is measured and multiplied by the reflected mass to determine a correction force:

$$F_{COR} = -M_{REFL} * (a_c - a_w) \quad (5)$$

where $a_c$ is the acceleration of the car body and $a_w$ is the acceleration of the wheel assembly, and the differential acceleration $(a_c - a_w)$ is known from the position sensor (e.g., by differentiating the position sensor output and converting from rotary to linear acceleration, if needed). This correction force is then added to the output force requested from external control circuitry so that the actuator as a whole produces the requested force.

In some examples, the control calculations are performed in the frequency domain. At low frequencies, up to about 4-6 Hz, the contribution of the reflected inertia term to the transfer of accelerations through the transmission, from wheel to car, is negligible, and the control is based on the acceleration directly. At higher frequencies, the reflected inertia is significant, increasing the transfer of undesired accelerations from the wheel to the car, and the control calculations take the resulting mass term into account to reduce this effect.

In some examples, the outputs of the encoders 144a, 146a are used to determine the relative acceleration of the wheel and the car. The encoders' outputs are differentiated twice to convert from position to acceleration. In some examples, an encoder with sin/cos tracks is used with a tracking filter on its incremental position. In this example, the acceleration is estimated internal to the filter and used by the control algorithms as needed. Conversion between the angular position indicated by the encoders and the linear extension of the output shaft is based on the design of the transmission—for example, for a ball screw, rotation is divided by thread pitch to find linear displacement. In some examples, only a single encoder is used, coupled to one of the motors, and the position of the other motor is inferred from the known geometric relationship between the motors and the transmission.

Using a single amplifier increases the effects of variations (tolerance stack-up) and compliances between the parts. In some examples, this makes the relative alignment of the stators between the two motors an important tolerance in the design and fabrication of the actuator assembly. In some examples, a single amplifier is used to drive both motors, based on the single encoder. The motors are arranged to produce equal torque in opposite directions based on a common input signal, for example, by arranging the coils of the stators 180° out of phase (depending on the number of poles used in a given motor design, other phase angles would be appropriate).

When the vehicle is accelerating or braking (i.e., subject to acceleration in the direction of travel, rather than vertically), the unsprung mass, generally being compliantly mounted, is subject to torques, some of which are transmitted into the actuator through the output shaft, rotating the rotors. When only one amplifier is used, the induced rotation takes the rotors out of the phase alignment expected by the control algorithms. As a result, the motors may not produce equal torque for a common signal, and peak torque is reduced. In some examples, to combat this, the motors are designed to tolerate the expected amount of induced rotation of the output shaft without moving far enough outside of the control regime to cause problems. That is, for the expected degree of induced rotation, the variation in relative torque between the motors will be insubstantial relative to the total torque produced. This is done, for example, by selecting motors with a low total number of poles, e.g., as few as 12 poles. An example of such a motor is the model K089300 motor from Parker Bayside of Port Washington, N.Y. In some examples, an additional shaft position sensor is used, and the control loop compensates for changes in the force arising from induced torques based on the known geometry of the actuator's components.

In some examples, braking and acceleration of the car produce different degrees of induced rotation on the output shaft and rotors. To compensate for this, the motors may be assembled with the stators having a known, preexisting degree of rotation away from perfect alignment so that the torques during braking and accelerating are the same. In some examples, the suspension also includes accelerometers that measure the acceleration of the vehicle in the direction of travel (as opposed to the vertical acceleration compensated by the actuator). This information can be used to predict and compensate for the rotation induced by hard braking or acceleration.

In some examples, in addition to the inertia-compensating control loop, an outer control loop is used to control the motors such that the actuator responds directly to a force command input, that is, the actuator is controlled directly as a force source, from the point of view of external controls. To accomplish this, a sensor is used to determine the force output of the actuator. The measured force output is fed back and combined with the desired force command in a feedback loop to drive the actuator to the desired force output. The force feedback value may be output of a direct force-sensing device, such as a strain gauge, or it may be something less direct, such as a difference of car-side and wheel-side accelerometers divided by a mass value.

Other implementations are within the scope of the following claims and other claims to which the applicant may be entitled.

What is claimed:

1. A suspension apparatus for coupling between a sprung mass and an unsprung mass of a vehicle comprising:
an active suspension apparatus comprising:
a first rotary motor coupled to a support structure;
a second rotary motor coupled to the support structure, and;
a rotary-to-linear motion conversion mechanism having an output shaft, the rotary-to-linear motion conversion mechanism coupled to the first and second rotary motors;
wherein the rotary-to-linear motion conversion mechanism converts simultaneous rotation of the first rotary motor in a first direction and of the second rotary motor in a second direction which is opposite the first direction, to linear motion of the output shaft, wherein a resultant reaction torque applied by the pair of oppositely rotating rotary motors to the support structure is reduced compared to a reaction torque applied to the support structure by at least one of the first or second rotary motors rotating alone.

2. The suspension apparatus of claim 1 wherein the support structure is coupled to the sprung mass of the vehicle and the output shaft of the rotary-to-linear motion conversion mechanism is coupled to the unsprung mass of the vehicle.

3. The suspension apparatus of claim 1 wherein the support structure is coupled to the unsprung mass of the vehicle and the output shaft of the rotary-to-linear motion conversion mechanism is coupled to the sprung mass of the vehicle.

4. The suspension apparatus of claim 1 wherein the output shaft of the rotary-to-linear motion conversion mechanism is selected from the group consisting of:
a roller screw, a magnetic screw, a hydrostatic screw, a lead screw, and a tapered roller screw.

5. The suspension apparatus of claim 1 further comprising a passive suspension apparatus comprising a spring, wherein at least a portion of the active suspension apparatus is located inside the spring.

6. The suspension apparatus of claim 5 wherein the spring is a coil spring.

7. The suspension apparatus of claim 5 wherein the spring is a pneumatic spring.

8. The suspension apparatus of claim 1 further comprising:
a sensor having an output indicating movement of the rotary-to-linear motion conversion mechanism; and
a controller for receiving a force command, computing a compensation force based on a reflected inertia of the rotary-to-linear motion conversion mechanism and an acceleration derived from the sensor output, and computing a reflected inertia compensated force command from the force command and the compensation force to cause the first and second motors to produce the reflected inertia compensated force at the output shaft of the rotary-to-linear motion conversion mechanism.

9. The suspension apparatus of claim 1 further comprising:
a sensor having an output indicative of a force output of the rotary-to-linear motion conversion mechanism; and
a controller for receiving a force command and the sensor output indicative of the force output of the rotary-to-linear motion conversion mechanism and in response to generate a modified force command for application to the first and second rotary motors, where the modified force command is based on a difference between the force command and the indicated force output.

10. A method for reducing reaction torque applied to a support structure of an active vehicle suspension apparatus, comprising:
a) coupling a first rotary motor to the support structure;
b) coupling a second rotary motor to the support structure;
c) coupling a rotary-to-linear motion conversion mechanism to the first and second rotary motors;
d) causing the first and second rotary motors to simultaneously rotate in opposite directions, and;
e) converting the simultaneous rotation of the first and second rotary motors to linear motion of an output shaft of the rotary-to-linear motion conversion mechanism;
wherein a resultant reaction torque applied by the pair of oppositely rotating rotary motors to the support structure is reduced compared to a reaction torque applied to the support structure by at least one of the first or second rotary motors rotating alone.

11. An active suspension apparatus coupled between a sprung mass and an unsprung mass of a vehicle comprising:
a first rotary motor coupled to a support structure;
a second rotary motor coupled to the support structure;

a back drivable rotary-to-linear motion conversion mechanism having an output shaft, the back drivable rotary-to-linear motion conversion mechanism coupled to the first and second rotary motors;

wherein the back drivable rotary-to-linear motion conversion mechanism converts linear motion of the output shaft resulting from a change in displacement between the sprung and unsprung masses of the vehicle into simultaneous rotation of the first and second rotary motors in opposite directions.

12. An active suspension apparatus coupled between a sprung mass and an unsprung mass of a vehicle comprising:

a first rotary motor coupled to a support structure;

a second rotary motor coupled to the support structure;

a back drivable rotary-to-linear motion conversion mechanism having an output shaft, the back drivable rotary-to-linear motion conversion mechanism coupled to the first and second rotary motors;

wherein the back drivable rotary-to-linear motion conversion mechanism converts simultaneous rotation of the first and second rotary motors in opposite directions into linear motion of the output shaft to modify the displacement between the sprung and unsprung masses of the vehicle.

* * * * *

UNITED STATES PATENT AND TRADEMARK OFFICE
CERTIFICATE OF CORRECTION

| | | |
|---|---|---|
| PATENT NO. | : 8,113,522 B2 | Page 1 of 1 |
| APPLICATION NO. | : 13/088075 | |
| DATED | : February 14, 2012 | |
| INVENTOR(S) | : Oteman et al. | |

It is certified that error appears in the above-identified patent and that said Letters Patent is hereby corrected as shown below:

On the title page item [75], should read Wade Torres.

Signed and Sealed this
Fourteenth Day of May, 2013

Teresa Stanek Rea
*Acting Director of the United States Patent and Trademark Office*